US 6,971,823 B2

(12) United States Patent
Satran et al.

(10) Patent No.: US 6,971,823 B2
(45) Date of Patent: Dec. 6, 2005

(54) CUTTING TOOL AND CARTRIDGE THEREFOR

(75) Inventors: Amir Satran, Kfar Vradim (IL); Talal Qeys, Beit-Jan (IL)

(73) Assignee: Iscar Ltd., Tefen (IL)

( * ) Notice: Subject to any disclaimer, the term of this patent is extended or adjusted under 35 U.S.C. 154(b) by 15 days.

(21) Appl. No.: 10/777,148

(22) Filed: Feb. 13, 2004

(65) Prior Publication Data

US 2004/0161311 A1 Aug. 19, 2004

(30) Foreign Application Priority Data

Feb. 16, 2003 (IL) ..................................... 154472

(51) Int. Cl.[7] .............................................. B23B 24/00
(52) U.S. Cl. ........................ 407/46; 407/101; 407/110
(58) Field of Search .............................. 407/33, 43, 50, 407/110, 46, 67, 101

(56) References Cited

U.S. PATENT DOCUMENTS

| 1,153,682 | A | * | 9/1915 | Gorton | 407/46 |
|---|---|---|---|---|---|
| 3,701,187 | A | * | 10/1972 | Erkfritz | 407/46 |
| 4,097,174 | A | | 6/1978 | Heinlein | |
| 5,161,920 | A | * | 11/1992 | Zinner | 407/110 |
| 5,833,403 | A | * | 11/1998 | Barazani | 407/101 |
| 6,186,704 | B1 | * | 2/2001 | Hale | 407/101 |
| 6,234,727 | B1 | * | 5/2001 | Barazani | 407/117 |
| 6,299,389 | B1 | * | 10/2001 | Barazani | 407/110 |
| 6,325,574 | B1 | * | 12/2001 | Treige | 407/35 |

FOREIGN PATENT DOCUMENTS

| DE | 23 37 469 | 2/1975 |
|---|---|---|
| GB | 940895 | 11/1963 |

* cited by examiner

*Primary Examiner*—Willmon Fridie, Jr.
(74) *Attorney, Agent, or Firm*—Womble Carlyle (57) ABSTRACT

A. cutting tool for metal cutting operations employing detachable cutting insert secured to cartridges. The cartridges have a clamping portion that is resiliently transformable between a normally non-expanded state and a biased expanded state by means of a clamping screw received in a through bore in the cartridge. The clamping portion is slidably insertable into the cartridge pocket when in the normally non-expanded state, and is securely retained in the cartridge pocket when in the biased expanded state.

17 Claims, 5 Drawing Sheets

CUTTING TOOL AND CARTRIDGE THEREFOR

FIELD OF THE INVENTION

The present invention relates to a cutting tool for machining metal workpieces, and more particularly to a rotary cutting tool having replaceable cutting inserts secured to a cartridge mounted in the tool body.

BACKGROUND OF THE INVENTION

Conventional cutting tools having cutting insert bearing cartridges, employ various means for securing the cartridge to the cutting tool body. In some cutting tools threaded bores are provided in the cutting tool body and corresponding through bores are provided in the cartridges. The cartridges are then secured to the cutting tool body by means of screws. Not only do threaded bores in the tool body require various metal cutting operations to produce them, or operations, but the mere presence of threaded bores can weaken the tool body. Furthermore, in the event of damage to the cutting tool, a broken off part of the screw can become lodged in the threaded bore. In other cutting tools, combinations of wedges and screws are used thereby requiring extra room for the wedges and limiting the circumferential pitch of the cartridges and consequently of the cutting inserts (i.e., the number of cutting inserts located around the circumferential surface of the cutting tool is limited). There are also known cutting tools that employ cartridge, or cartridge/wedge combinations, retained in a cartridge pocket in the tool body and in which the cutting insert is located partially in the cartridge pocket. This not only limits the geometry of the cutting insert but also takes up more room than if the cutting insert would not be located in the cartridge pocket, thereby limiting the circumferential pitch of the cutting inserts.

In other cutting tools, especially thin blade-like slotting cutters and holder blades, cartridges, also known as shims or segments, are used which generally rely on resilient clamping means with the segment being located in a recess between resiliently movable jaws and with a cutting insert being located in a recess of the segment. However, these segments are not suitable for high-speed rotating tools since they can fly out of the recess. Furthermore, in order to avoid lateral movement of the segment, the surfaces of jaws and of the segment that are in contact are interlocking "V-shaped". This precludes any lateral adjustment of the segment relative to the tool body.

It is an object of the present invention to provide a cutting tool employing an insert-bearing cartridge and a cartridge therefor that significantly reduce or overcome the aforementioned disadvantages.

SUMMARY OF THE INVENTION

In accordance with the present invention there is provided a cutting tool for metal cutting operations comprising a tool body having at least one cutting portion, the at least one cutting portion comprising:
a cartridge pocket having a retaining portion;
a cartridge comprising a clamping portion and an insert bearing portion having an insert pocket with a detachable cutting insert retained therein, the clamping portion being resiliently transformable between a normally non-expanded state and a biased expanded state, wherein
the clamping portion is slidably insertable into the cartridge pocket retaining portion when in the normally non-expanded state, and is securely retained in the cartridge pocket retaining portion when in the biased expanded state and the insert pocket and the cutting insert are located external to the cartridge pocket retaining portion.

In accordance with the present invention, the cartridge pocket comprises a cutout in the tool body having a generally concave inner surface bounded by two substantially equally shaped opposing side openings formed in the tool body, the cartridge pocket opening out to a circumferential side surface of the tool body; the inner surface comprising opposing upper and lower surfaces extending from a rear surface to the circumferential side surface.

Further in accordance with the present invention, the cartridge is slidably insertable into the cartridge pocket through one of the side openings along an axis of lateral displacement of the cartridge pocket.

Quite generally, the axis of lateral displacement is parallel to the inner surface of the cartridge pocket.

In accordance with the present invention, a portion of the upper surface comprises an upper support surface inclined relative to a line perpendicular to the rear surface of the cartridge pocket and the lower surface comprises two lower support surfaces, a primary forward support surface adjacent the circumferential side surface and a primary rear support surface adjacent the rear surface, the primary forward and rear support surfaces being inclined relative to the line.

Preferably, the primary forward and rear support surfaces are separated by a central depressed surface.

If desired, the lower surface further comprises at least two secondary support surfaces, a secondary forward support surface located between the primary forward support surface and the circumferential side surface and a secondary rear support surface located between the primary rear support surface and the central depressed surface, the secondary forward and rear support surfaces being inclined relative to the line.

In accordance with the present invention, the cartridge comprises a top surface, a bottom surface and a peripheral side surface extending therebetween, the peripheral side surface comprising back and front opposing surfaces and two parallel side surfaces extending between the back and front surfaces, a slit traverses the clamping portion between the side surfaces and opens out to the back surface, the slit divides the clamping portion into an upper clamping jaw resiliently connected to a lower base jaw, a through bore located partially in the slit traverses the clamping portion.

Typically, the through bore has a cylindrical central region with two end regions a first end region opening outwardly to one side surface and a second end region opening outwardly to the opposing side surface.

Preferably, each end region of the through bore is slightly oval in shape in a side view of the cartridge and is defined by two diameters, a major diameter, parallel to the slit, and a minor diameter, perpendicular to the slit, where the major diameter is greater than the minor diameter.

In accordance with the present invention, a forward portion of the top surface of the clamping jaw constitutes a top abutment surface, for abutting the upper support surface of the cartridge pocket and the bottom surface of the cartridge is provided with two bottom abutment surfaces, corresponding to, and for engagement with, the two lower support surfaces, of the lower surface of the cartridge pocket, the top abutment surface and bottom abutment surfaces, are inclined in a matching fashion to the upper support surface and lower support surfaces, respectively.

Preferably, the bottom abutment surfaces are separated by a central relieved portion of the bottom surface.

If desired, the bottom surface further comprises two secondary abutment surfaces, a secondary forward abutment surface located between the primary forward abutment surface and the front surface and a secondary rear abutment surface located between the primary rear abutment surface and the central relieved portion.

Preferably, the top abutment surface and bottom abutment surfaces are inclined in a matching fashion to the upper support surface and lower support surfaces, respectively.

Quite generally, with the cartridge securely retained in the cartridge pocket, the back surface of the cartridge abuts the rear surface of the cartridge pocket, a top abutment surface of the cartridge abuts an upper support surface of the cartridge pocket and at least two abutment surfaces of the bottom surface of the cartridge abut a corresponding at least two support surfaces of the lower surface of the cartridge pocket.

Preferably, the clamping portion is transformable from the normally non-expanded state to the biased state by tightening a clamping screw wholly contained in the through bore.

Further preferably, the clamping screw has a conical head and a threaded free end and a nut with a knurled conical surface is screwed onto the free end so that the conical head of the clamping screw is located in the first end region of the two end regions of the through bore and the nut is located in the second end region.

There is also provided in accordance with the present invention, a cartridge for securing in a cartridge pocket of a cutting tool for metal cutting operations comprising:

a clamping portion and an insert bearing portion having an insert pocket with a detachable cutting insert retained therein, the clamping portion being resiliently transformable between a normally non-expanded state and a biased expanded state, wherein the clamping portion being slidably insertable into the cartridge pocket when in the normally non-expanded state, and being securely retained in the cartridge pocket when in the biased expanded state with the insert pocket and the cutting insert located external to the cartridge pocket.

BRIEF DESCRIPTION OF THE DRAWINGS

For a better understanding of the present invention and to show how the same may be carried out in practice, reference will now be made to the accompanying illustrative drawings, in which.

DETAILED DESCRIPTION OF THE INVENTION

Figure 1:
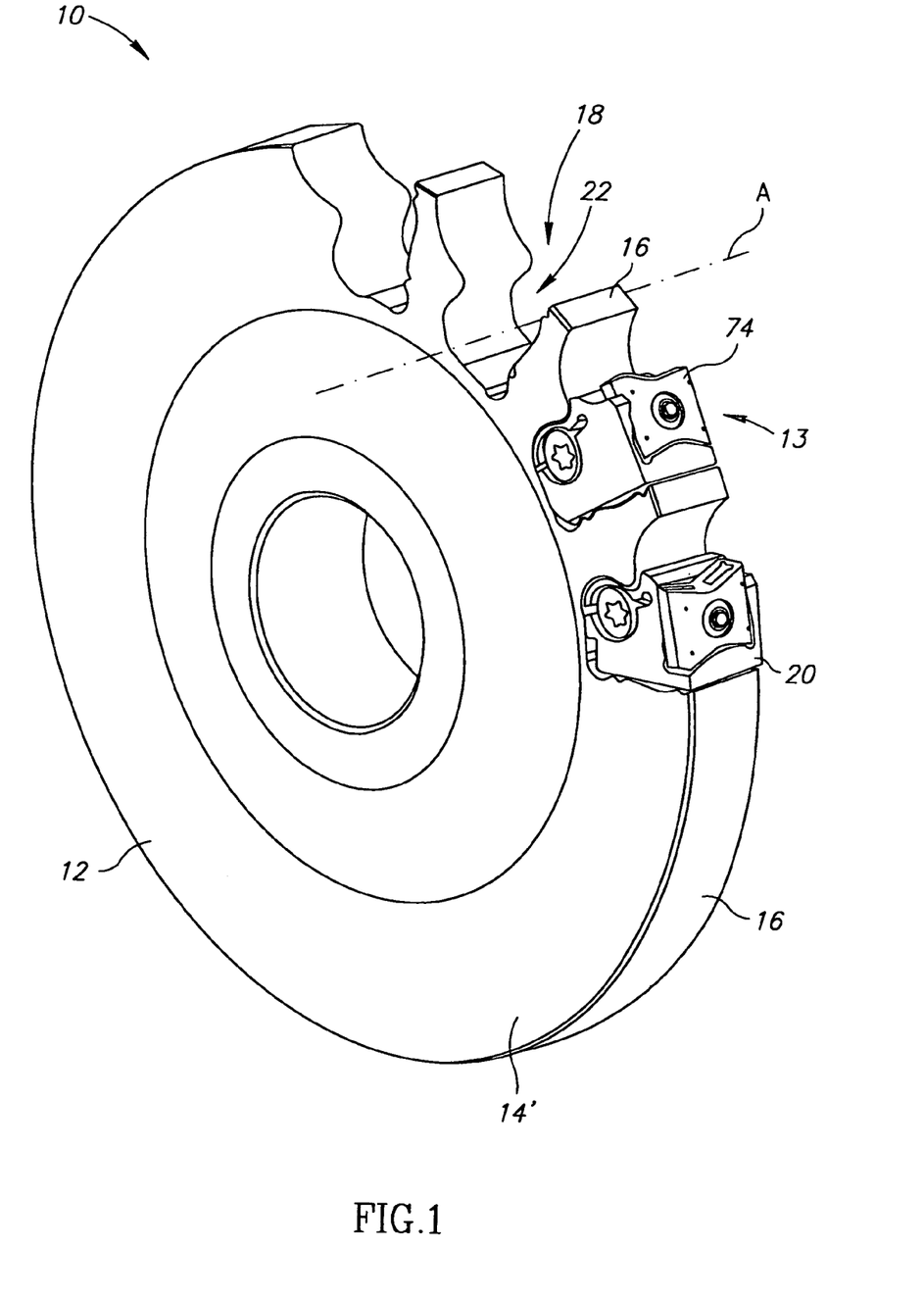
FIG. 1 is a perspective view of a disc-like milling cutter employing cartridges in accordance with the present invention, showing four cartridge pockets and two cartridges.
Figure 2:
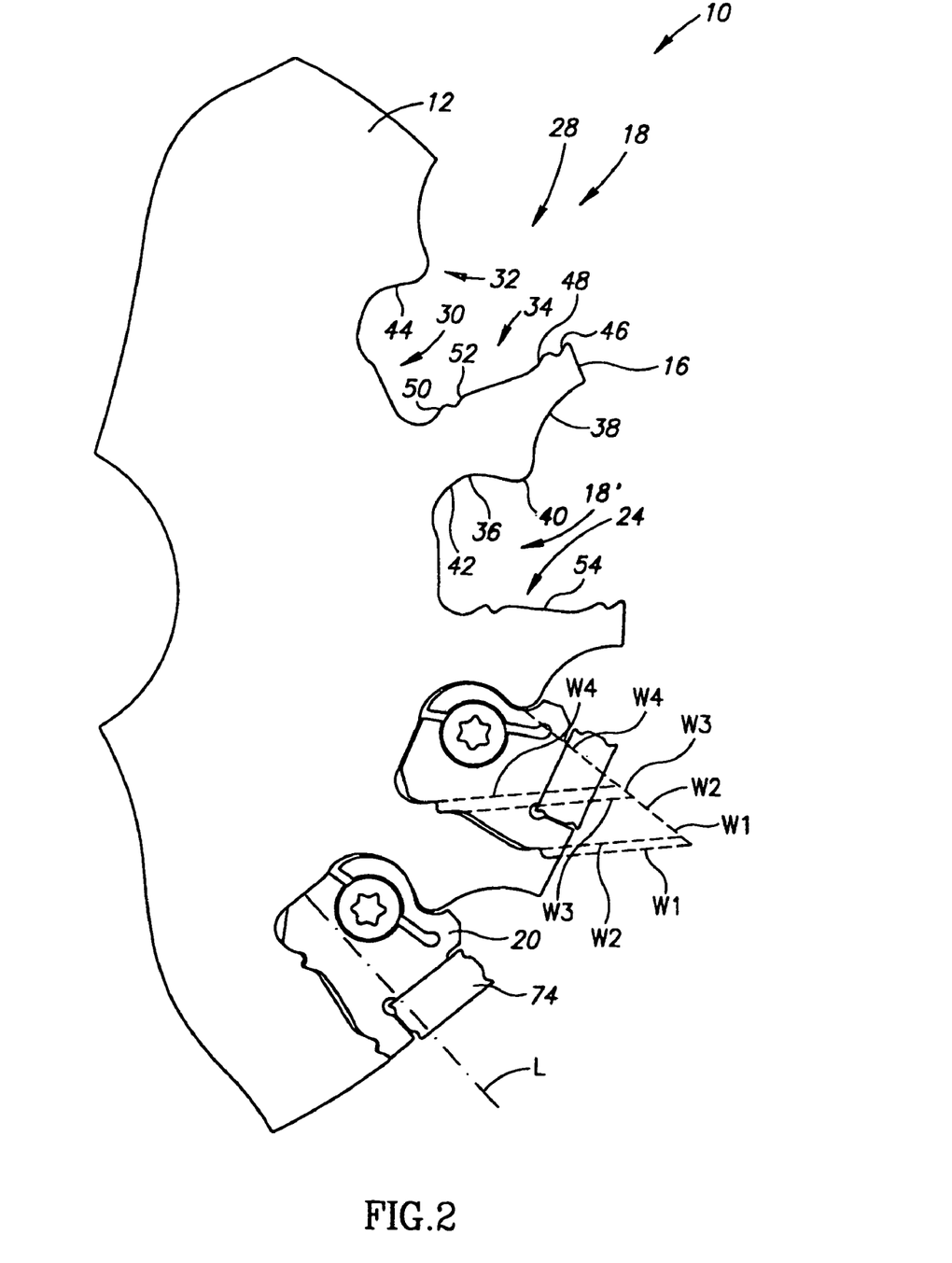
FIG. 2 is a side view of disc-like milling cutter shown in FIG. 1.
Figure 3:
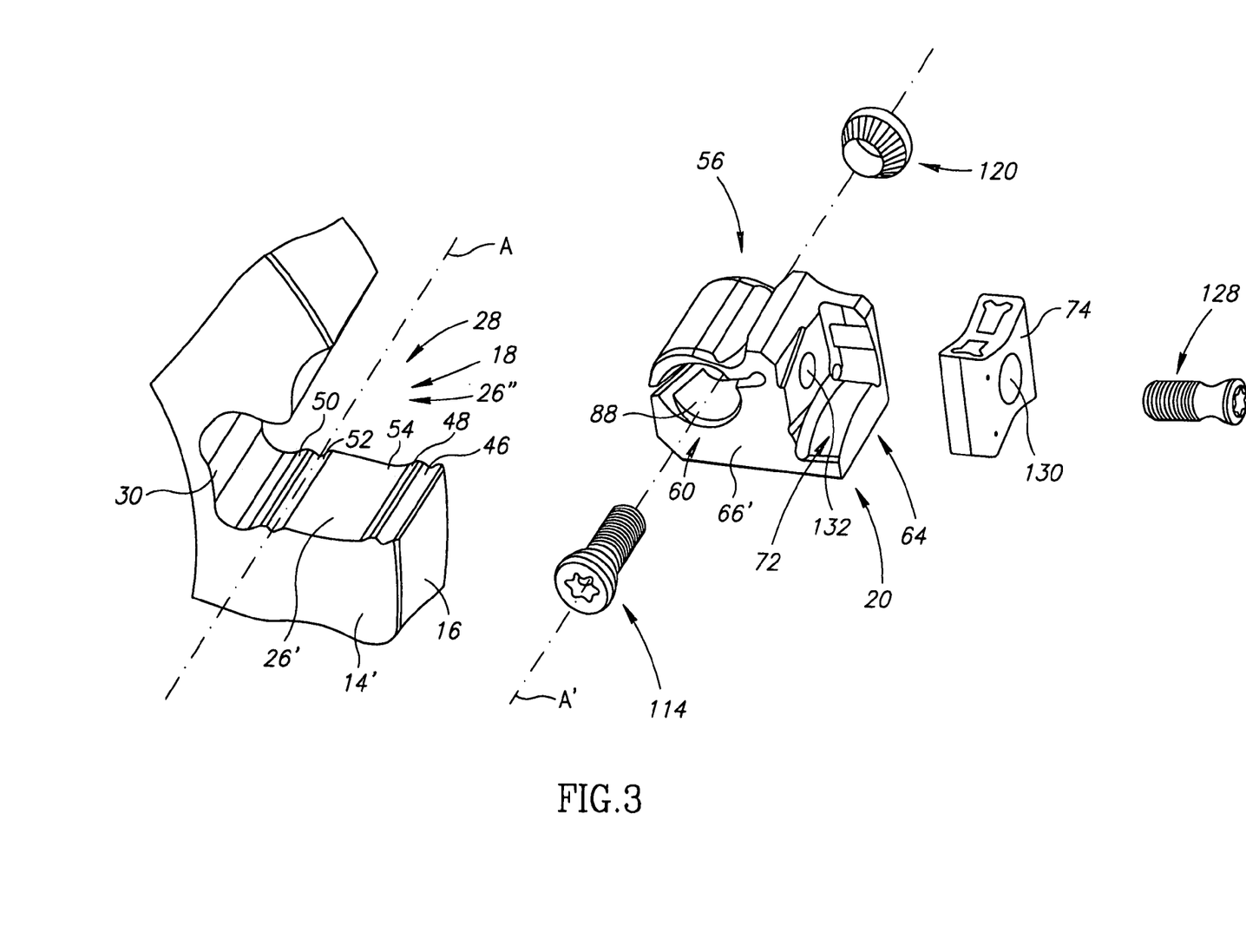
FIG. 3 is a partial exploded view of the milling cutter shown in FIG. 1.
Figure 4:
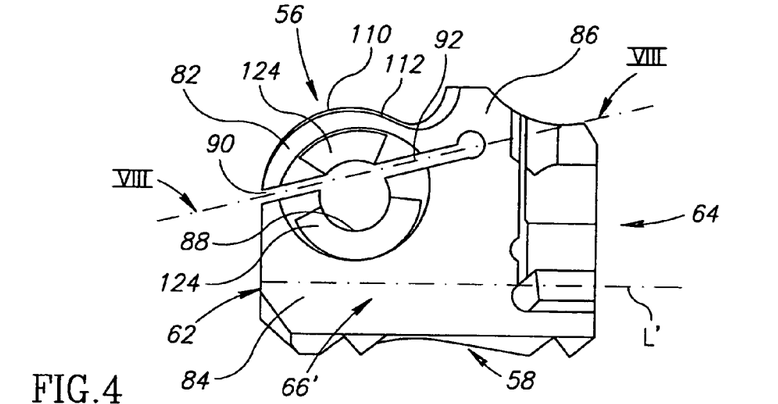
FIG. 4 is a side view of a cartridge in accordance with the present invention.
Figure 5:
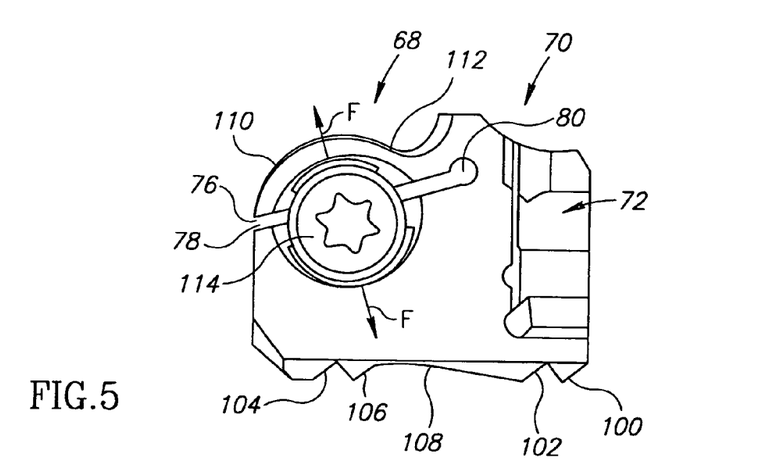
FIG. 5 is a side view of a cartridge in accordance with the present invention including a clamping screw.

Attention is drawn to the drawings in which FIGS. 1 to 3 show a cutting tool 10 in accordance with the present invention. The particular cutting tool chosen to illustrate the invention is a disc-shaped milling cutter comprising a tool body 12 having two generally parallel end surfaces 14', 14" (end surface 14" is on the hidden side of the tool body 12 and therefore not seen in the drawings) and a circumferential side surface 16 extending between the end surfaces 14', 14". The tool body 12 is provided with a plurality of circumferentially spaced apart cutting portions 13, each cutting portion 13 comprising a cartridge pocket 18 with an insert-bearing cartridge 20 retained therein.

Reference is now also made to FIGS. 4 to 8. Each cartridge pocket 18 is formed by a through going cutout 22, or groove, in the tool body 12, constituting an open ended housing having a generally concave inner surface 24 bounded by two substantially equally shaped opposing side openings 26', 26" formed in the end surfaces 14', 14" of the tool body 12 and a front opening 28 formed in the circumferential side surface 16 of the tool body 12. The inner surface 24 comprises a rear surface 30 and opposing upper and lower surfaces 32, 34 extending from the rear surface 30 to the circumferential side surface 16 of the tool body 12. Therefore, the cutout 22 is open on three sides 26', 26", 28, opening out to the two end surfaces 14', 14" and to the circumferential side surface 16 of the tool body 12. The upper surface 32 is divided into a rear upper surface 36 and a forward upper surface 38 separated by an upper surface protrusion 40 protruding towards the lower surface 34. The rear upper surface 36 is adjacent to and merges with the rear surface 30 and the forward upper surface 38 is adjacent to and merges with the circumferential side surface 16 of the tool body 12. The rear upper surface 36 forms together with the upper surface protrusion 40 a recess 42, a forward portion of which constitutes an upper support surface 44 which is inclined relative to a line L perpendicular to the rear surface 30 of the cartridge pocket 18. The forward upper surface 38 is concavely shaped and forms a chip gullet for chips removed from a workpiece during a cutting operation.

The lower surface 34 of the cartridge pocket 18 is provided with four lower support surfaces 46, 48, 50, 52, a pair of forward support surfaces 46, 48 adjacent the circumferential side surface 16 of the tool body 12 and a pair of rear support surfaces 50, 52 adjacent the rear surface 30. The forward and rear support surfaces are separated by a central depressed surface 54. Of the two forward support surfaces, the one closest the circumferential side surface 16 of the tool body 12 constitutes a secondary forward support surface 46 and the other one a primary forward support surface 48. Similarly, the rear support surface closest the rear surface 30 of the cartridge pocket 18 constitutes a primary rear support surface 50 and the other rear support surface constitutes a secondary rear support surface 52. The lower support surfaces 46, 48, 50, 52 are inclined relative to the line L perpendicular to the rear surface 30 of the cartridge pocket 18. The inclinations of the upper support surface 44 and each of the lower support surfaces 46, 48, 50, 52 is such that they lie on opposite surfaces of associated imaginary wedges W1, W2, W3, W4 (shown by dashed lines in FIG. 2) that taper forwardly, i.e., in a direction from the rear surface 30 to the front opening 28. In other words, the upper support surface 44 and each of the lower support surfaces 46, 48, 50, 52 of the lower surface 34 forms an open ended wedge structure which, as will be described in greater detail below, forms part of a mechanism of a cartridge pocket retaining portion 18' for retaining the cartridge 20 in the cartridge pocket 18. It will be appreciated that the terms upper, forward, lower and rear are not defined globally, but are defined herein with respect to each cartridge pocket 18 when referring to a cartridge 20 generally oriented as shown in FIGS. 2 and 3.

Each cartridge 20 comprises top and bottom opposing surfaces 56, 58 and a peripheral side surface 60 extending therebetween. The peripheral side surface 60 comprises back and front opposing surfaces 62, 64 and two parallel side surfaces 66', 66" extending between the back and front surfaces 62, 64. Quite generally, the cartridge 20 comprises a rear clamping portion 68 and a forward insert bearing portion 70. The insert bearing portion 70 is provided with an insert pocket 72 which can be of any required shape depending on the shape of a cutting insert 74 to be retained therein. The cutting tool 10 is for metal cutting operations and the cutting insert 74 is made of extremely hard and wear-resistant material such as cemented carbide, typically by form-pressing and sintering carbide powders in a binder.

The cartridge 20 has a slit 76 which traverses the clamping portion 68 between the side surfaces 66', 66". The slit 76 opens out to the side surfaces 66', 66" and to the back surface 62. In a side view of the cartridge 20, the slit 76 extends from a back opening 78 in the back surface 62 towards the front surface 64 sloping generally upwardly, that is, towards the top surface 56 and terminates in a generally circular termination 80. Therefore, the back opening 78 is nearer the bottom surface 58 than the generally circular termination 80. The slit 76 divides the clamping portion 68 into an upper clamping jaw 82 resiliently connected to a lower base jaw 84 via a narrow neck region 86.

A through bore 88 traverses the clamping portion 68 of the cartridge 20 from one side surface 66' to the other side surface 66". The through bore 88 is located partially in the base jaw 84, partially in the slit 76 and partially in the clamping jaw 82, thereby dividing the slit 76 into two portions, a forward portion 90 and a rear portion 92. The through bore 88 has a cylindrical central region 94 with two end regions a first end region 96 opening outwardly to one side surface 66' and a second end region 98 opening outwardly to the opposing side surface 66". In a side view of the cartridge 20, each end region 96, 98 of the through bore 88 is slightly oval in shape being defined by two diameters, a major diameter D1, parallel to the slit 76, and a minor diameter D2, perpendicular to the slit 76. The major diameter being greater than the minor diameter. As will be described in greater detail below, this arrangement ensures that clamping forces applied to the through bore 88 are directed in a preferred direction.

In order to securely retain the cartridge 20 in the cartridge pocket 18, the bottom surface 58 of the cartridge 20 is provided with four bottom abutment surfaces 100, 102, 104, 106 corresponding to, and for engagement with, the four lower support surfaces 46, 48, 50, 52 of the lower surface 34 of the cartridge pocket 18. The four bottom abutment surfaces 100, 102, 104, 106 are divided into a pair of forward bottom abutment surfaces 100, 102 adjacent the front surface 64 and a pair or rear bottom abutment surfaces 104, 106 adjacent the back surface 62, the two pairs of abutment surfaces being separated by a central relieved portion 108 of the bottom surface 58. Of the two forward bottom abutment surfaces 100, 102, the one closest the front surface 64 constitutes a secondary forward abutment surface 100, whereas the other forward bottom abutment surface constitutes a primary forward abutment surface 102. Of the two rear bottom abutment surfaces 104, 106, the rear abutment surface closest the back surface 62 of the cartridge 20 constitutes a primary rear abutment surface 104 whereas the other rear bottom abutment surface constitutes a secondary rear abutment surface 106.

The clamping jaw 82 has a top surface 110 which forms part of the top surface 56 of the cartridge 20. The top surface 110 of the clamping jaw 82 is generally convex in a side view of the cartridge 20 and is so shaped that when the cartridge 20 is secured in the cartridge pocket 18, a forward portion of the top surface 110 of the clamping jaw 82 constitutes a top abutment surface 112, for abutting the upper support surface 44 of the cartridge pocket 18. The top abutment surface 112 and bottom abutment surfaces 100, 102, 104, 106 are inclined relative to a line L' perpendicular to the back surface 62 in a matching fashion to the upper support surface 44 and lower support surfaces 46, 48, 50, 52, respectively, i.e., the top and bottom abutment surfaces 112, 100, 102, 104, 106 taper forwardly. In other words, the top and bottom abutment surfaces lie on the surface of an open ended wedge structure that tapers in a direction from the back surface 62 of the cartridge 20 to the front surface 64 thereof and which cooperates with the open ended wedge structure of the upper and lower support surfaces 44, 46, 48, 50, 52 of the cartridge pocket 18 in order to wedgingly retain the cartridge 20 in the cartridge pocket 18.

As can be seen in FIG. 2, in a side view of the disc-shaped milling cutter 10 the contour of the clamping jaw 82 and the back and bottom surfaces 62, 58 of the cartridge 20 generally matches the contour of the rear upper surface 32 and the rear and lower surfaces 30, 34 of the cartridge pocket 18, respectively. Therefore, and as a consequence of the engaging surfaces of the cooperating open wedge structures of the cartridge 20 and cartridge pocket 18, in order to position the cartridge 20 in the cartridge pocket 18, the cartridge 20 has to be slidingly inserted into the cartridge pocket 18 through one of the side openings 26', 26" along an axis of lateral displacement A of the cartridge pocket 18. The dimensions of the cartridge 20 and the cartridge pocket 18 are such that with the cartridge 20 located in the cartridge pocket 18 the cartridge 20 can be slidingly displaced laterally to a required position relative to the cartridge pocket 18.

With the cartridge 20 located in the required position a clamping screw 114, having a conical head 116 and a threaded free end 118, is inserted in the through bore 88 from one side surface 66' and a nut 120 with a knurled conical surface 122 is screwed onto the free end 118 of the clamping screw 114 at the opposing side surface 66' of the cartridge 20 so that the conical head 116 of the clamping screw 114 is located in the first end region 96 of the two end regions of the through bore 88, and the nut 120 is located in the second end region 98. The clamping screw 114 has an axis A' which, when the cartridge is 20 located in the cartridge pocket 18, is parallel to the axis of lateral displacement A of the cartridge pocket 18.

As the clamping screw 114 is tightened, the nut 120 becomes lodged in the second end region 98 due to friction between the surface of the second end region 98 and the knurled conical surface 122 of the nut 120. Due to the fact that the two end regions 96, 98 of the through bore 88 are oval in shape, the head 116 of the clamping screw 114 and nut 120 abut the end regions 96, 98 in which they are located along abutment sections 124 of the end regions 96, 98 centered around the minor diameter D2 of the end regions 96, 98. Consequently, the force F applied by the clamping screw head 116 and the nut 120 to their respective abutment sections 124 is directed along a line which coincides with the minor diameter D2. As the clamping screw 114 is tightened, the clamping jaw 82 is forced away from the base jaw 84 and the width of the slit 76 correspondingly increases. Therefore, tightening the clamping screw 114 transforms the cartridge 20 from a normal non-expanded state to a biased expanded state. When the clamping screw 114 is un-tightened, the cartridge 20 returns to its normal non-expanded state.

As the clamping screw 114 is initially tightened, only the primary abutment surfaces 102, 104 of the bottom surface 58 of the cartridge 20 abut the primary support surfaces 48, 50 of the lower surface 34 of the cartridge pocket 18. Also, the back surface 62 of the cartridge 20 abuts the rear surface 30 of the cartridge pocket 18 and top abutment surface 112 of the cartridge 20 abuts the upper support surface 44 of the cartridge pocket 18. As the clamping screw 114 is further tightened, the secondary abutment surfaces 100, 106 of the bottom surface 58 of the cartridge 20 come into contact with the secondary support surfaces 46, 52 of the lower surface 34 of the cartridge pocket 18 through deformation, and the cartridge 20 becomes securely wedged in the cartridge pocket 18. Generally, the cartridge 20 can be securely wedged in the cartridge pocket 18 with only the primary abutment surfaces 102, 104 and the primary support surfaces 48, 50 in abutment. However, in the presence of large forces it is preferable to provide the cartridge 20 and the cartridge pocket 18 with the additional secondary abutment surfaces 100, 106 and secondary support surfaces 46, 52, respectively. The addition of more abutment and support surfaces on the bottom surface of the cartridge 20 and the lower surface of the cartridge pocket 18, respectively, is feasible however, unless they were produced with a high degree of accuracy they would generally not contribute to the securing of the cartridge 20 in the cartridge pocket 18 since in general they would not come into abutment due to manufacturing tolerances. Quite generally, a displacement of the clamping jaw 82 by a few hundredths of a millimeter from its normal non-expanded state to its biased expanded state is sufficient to ensure secure retainment of the cartridge 20 in the cartridge pocket 18.

As can clearly be seen in the drawings, when the cartridge 20 is securely retained in the cartridge pocket 18 the insert pocket 72 and the cutting insert 74 are located external to the cartridge pocket retaining portion 18'. It is only the clamping portion 68 of the cartridge 20 that is located in the cartridge pocket retaining portion 18'. The through bore 88 is located wholly in the clamping portion 68 of the cartridge 20. Consequently, the clamping screw 114 is located wholly in the clamping portion 68 of the cartridge 20 and there is a complete separation of functions between the clamping portion 68 and insert bearing portion 70 of the cartridge 20. The cutting insert is secured to the insert pocket 72 by means of a securing screw 128 which is received in a through bore 130 in the cutting insert 74 and is threadingly received in a threaded bore 132 in the insert pocket 72. The cartridge 20 can be positioned in the cartridge pocket 18 and securely retained therein, either with the cutting insert 74 retained in the insert pocket 72 or without the cutting insert 74 retained in the insert pocket 72 due to the complete functional separation between the clamping portion 68 and insert bearing portion 70 of the cartridge 20.

Figure 6:
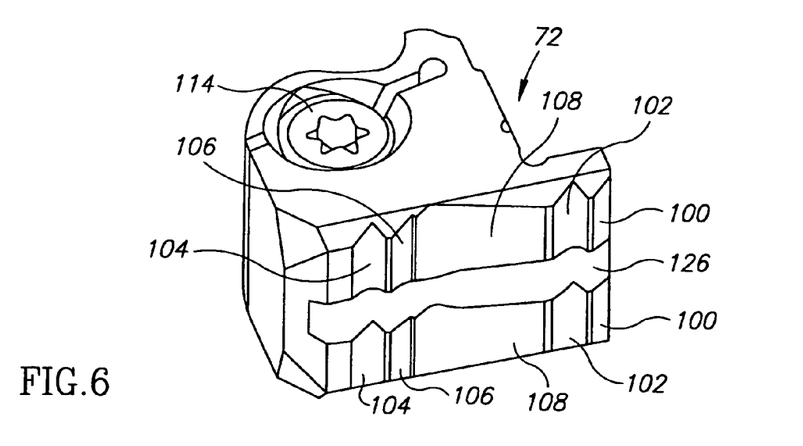
FIG. 6 is a bottom perspective view of a cartridge in accordance with the present invention.
Figure 7:
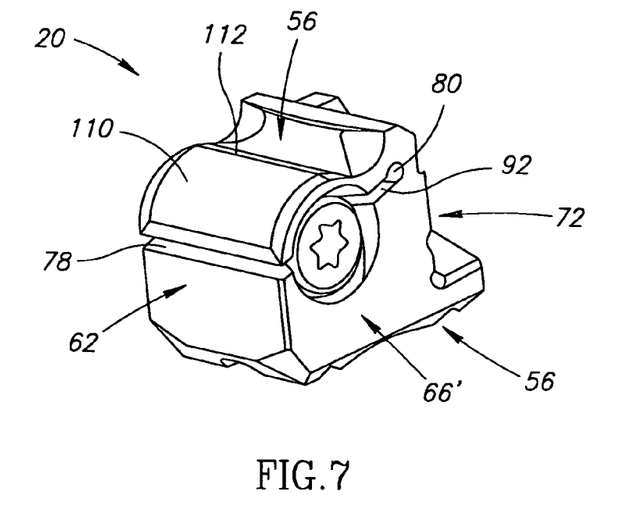
FIG. 7 is a top perspective view of a cartridge in accordance with the present invention.
Figure 8A:
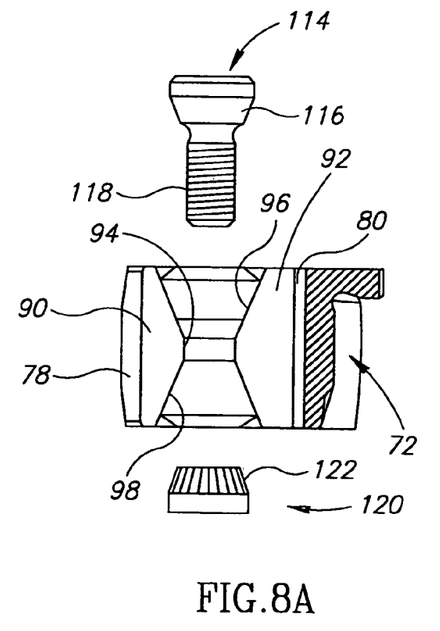
FIG. 8A is a cross section of the cartridge taken along the line VIII—VIII in FIG. 4, with the clamping screw and nut located outside the through bore.
Figure 8B:
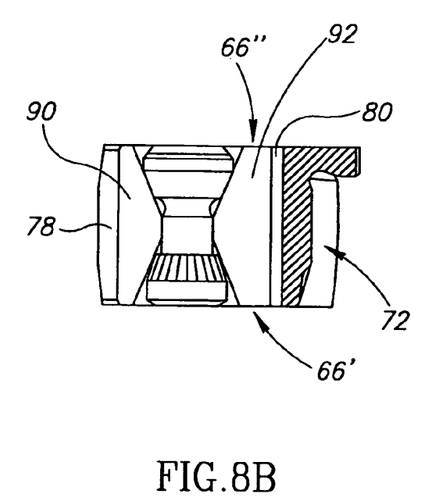
FIG. 8B is a cross section of the cartridge taken along the line VIII—VIII in FIG. 4, with the clamping screw and nut located in the through bore.

As can be seen in FIG. 6, the abutment surfaces 100, 102, 104, 106 on the bottom surface 58 of the cartridge 20 are divided into two outer portions by a central groove 126 extending between the front and back surfaces 64, 62 of the cartridge 20. This means that contact between the abutment surfaces 100, 102, 104, 106 on the bottom surface 58 of the cartridge 20 and the support surfaces 46, 48, 50, 52 on the lower surface 34 of the cartridge pocket 18 is well defined at the at these outer portions, thereby ensuring that the location of the cutting insert 17 will be well defined at a predetermined position.

It should be noted that the cartridge 20 is securely retained in the cartridge pocket 18 without the need of an external clamp connected to the tool body 12 and without the need for any form of securing screw to screw connect the cartridge 20 to the tool body 12. This brings about a saving in space and enables an increase in the pitch of the circumferential spacing of the cartridges 20 around the circumferential side of the tool body 12. Furthermore, the lateral position of the cartridge 20 can easily be adjusted by loosening the clamping screw 114, without completely removing it, and slidably adjusting the cartridge 20 into a new position and finally tightening the clamping screw 114. This not only enables fine tuning of the cartridge's 20 position but it also enables adjustment of the width of the effective cutting edge by using alternate left and right hand cartridges 20 and suitably adjusting the lateral location of alternate cartridges 20.

Although the present invention has been described to a certain degree of particularity, it should be understood that various alterations and modifications could be made without departing from the scope of the invention as hereinafter claimed. In particular, whilst the present invention has been described and illustrated with respect to a milling cutter having a disc-shaped tool body 12, the present invention equally applies to other milling cutters such as face mills and extended flute milling cutters.

What is claimed is:

1. A cutting tool for metal cutting operations comprising a tool body having at least one cutting portion, the at least one cutting portion comprising:

a cartridge pocket having a retaining portion;

a cartridge comprising a clamping portion and an insert bearing portion having an insert pocket with a detachable cutting insert retained therein, the clamping portion being resiliently transformable between a normally non-expanded state and a biased expanded state, wherein the clamping portion is slidably insertable into the cartridge pocket retaining portion when in the normally non-expanded state, and is securely retained in the cartridge pocket retaining portion when in the biased expanded state and the insert pocket and the cutting insert are located external to the cartridge pocket retaining portion, wherein the cartridge pocket comprises a cutout in the tool body having a generally concave inner surface bounded by two substantially equally shaped opposing side openings formed in the tool body, the cartridge pocket opening out to a circumferential side surface of the tool body; the inner surface comprising opposing upper and lower surfaces extending from a rear surface to the circumferential side surface.

2. The cutting tool according to claim 1, wherein the cartridge is slidably insertable into the cartridge pocket through one of the side openings along an axis of lateral displacement of the cartridge pocket.

3. The cutting tool according to claim 2, wherein the axis of lateral displacement is parallel to the inner surface of the cartridge pocket.

4. The cutting tool according to claim 1, wherein:
a portion of the upper surface comprises an upper support surface inclined relative to a line perpendicular to the rear surface of the cartridge pocket, and
the lower surface comprises two lower support surfaces: a primary forward support surface adjacent the circumferential side surface, and a primary rear support surface adjacent the rear surface, the primary forward and rear support surfaces being inclined relative to the line.

5. The cutting tool according to claim 4, wherein the primary forward and rear support surfaces are separated by a central depressed surface.

6. The cutting tool according to claim 5, wherein the lower surface further comprises at least two secondary support surfaces, a secondary forward support surface located between the primary forward support surface and the circumferential side surface and a secondary rear support sin-face located between the primary rear support surface and the central depressed surface, the secondary forward and rear support surfaces being inclined relative to the line.

7. The cutting tool according to claim 1, wherein the cartridge further comprises:
a top surface, a bottom surface, and a peripheral side surface extending therebetween, the peripheral side surface comprising back and front opposing surfaces and two parallel side surfaces extending between the back and front surfaces;
a slit traversing the clamping portion between the side surfaces and opening out to the back surface, thereby dividing the clamping portion into an upper clamping jaw resiliently connected to a lower base jaw; and
a through bore located partially in the slit and traversing the clamping portion.

8. The cutting tool according to claim 7, wherein the through bore has a cylindrical central region with two end regions:
a first end region opening outwardly to one side surface, and
a second end region opening outwardly to the opposing side surface.

9. The cutting tool according to claim 8, wherein each end region of the through bore is slightly oval in shape in a side view of the cartridge and is defined by two diameters: a major diameter parallel to the slit, and a minor diameter perpendicular to the slit, where the major diameter is greater than the minor diameter.

10. The cutting tool according to claim 8, wherein the clamping portion is transformable from the normally non-expanded state to the biased state by tightening a clamping screw wholly contained in the through bore.

11. The cutting tool according to claim 10, wherein:
the clamping screw has a conical head and a threaded free end; and
a nut with a knurled conical surface is screwed onto the free end so that the conical head of the clamping screw is located in the first end region of the two end regions of the through bore and the nut is located in the second end region.

12. The cutting tool according to claim 7, wherein:
a portion of the upper surface comprises an upper support surface inclined relative to a line perpendicular to the rear surface of the cartridge pocket, and
the lower surface comprises two lower support surfaces: a primary forward support surface adjacent the circumferential side surface, and a primary rear support surface adjacent the rear surface, the primary forward and rear support surfaces being inclined relative to the line.

13. The cutting tool according to claim 12, wherein:
a forward portion of the top surface of the clamping jaw constitutes a top abutment surface for abutting the upper support surface of the cartridge pocket; and
the bottom surface of the cartridge is provided with a primary forward abutment surface and a primary rear abutment surface, corresponding to, and for engagement with, the two lower support surfaces of the lower surface of the cartridge pocket; wherein
the top abutment surface and the primary forward and rear abutment surfaces are inclined in a matching fashion to the upper support surface and lower support surfaces, respectively.

14. The cutting tool according to claim 13, wherein the primary forward and rear abutment surfaces are separated by a central relieved portion of the bottom surface.

15. The cutting tool according to claim 14, wherein the bottom surface further comprises two secondary abutment surfaces:
a secondary forward abutment surface located between the primary forward abutment surface and the front surface; and
a secondary rear abutment surface located between the primary rear abutment surface and the central relieved portion.

16. The cutting tool according to claim 15, wherein the top abutment surface and primary forward and rear abutment surfaces are inclined in a matching fashion to the upper support surface and lower support surfaces, respectively.

17. The cutting tool according to claim 16, wherein with the cartridge securely retained in the cartridge pocket, the back surface of the cartridge abuts the rear surface of the cartridge pocket, a top abutment surface of the cartridge abuts an upper support surface of the cartridge pocket and at least two abutment surfaces of the bottom surface of the cartridge abut a corresponding at least two support surfaces of the lower surface of the cartridge pocket.

* * * * *